US012437358B2

(12) United States Patent
Liba et al.

(10) Patent No.: US 12,437,358 B2
(45) Date of Patent: Oct. 7, 2025

(54) PERFORMING SEGMENTATION OF OBJECTS IN MEDIA ITEMS BASED ON USER INPUT

(71) Applicant: Google LLC, Mountain View, CA (US)

(72) Inventors: Orly Liba, Mountain View, CA (US); Navin Sarma, Mountain View, CA (US); Yael Pritch Knaan, Mountain View, CA (US); Alexander Schiffhauer, Mountain View, CA (US); Longqi Cai, Mountain View, CA (US); David Jacobs, Mountain View, CA (US); Huizhong Chen, Mountain View, CA (US); Siyang Li, Mountain View, CA (US); Bryan Feldman, Mountain View, CA (US)

(73) Assignee: Google LLC, Mountain View, CA (US)

( * ) Notice: Subject to any disclaimer, the term of this patent is extended or adjusted under 35 U.S.C. 154(b) by 336 days.

(21) Appl. No.: 17/968,645

(22) Filed: Oct. 18, 2022

(65) Prior Publication Data
US 2023/0118361 A1 Apr. 20, 2023

Related U.S. Application Data

(60) Provisional application No. 63/257,111, filed on Oct. 18, 2021.

(51) Int. Cl.
*G06T 7/11* (2017.01)
*G06T 3/40* (2006.01)
*G06T 5/77* (2024.01)

(52) U.S. Cl.
CPC .............. *G06T 3/40* (2013.01); *G06T 5/77* (2024.01); *G06T 7/11* (2017.01); *G06T 2200/24* (2013.01);

(Continued)

(58) Field of Classification Search
CPC .............. G06V 10/82; G06V 10/235; G06T 2207/20081; G06T 2207/20084;
(Continued)

(56) References Cited

U.S. PATENT DOCUMENTS 11,048,977 B1 * 6/2021 Ulbricht ................. G06V 10/98
2017/0287137 A1 * 10/2017 Lin ....................... G06V 10/454
(Continued)

FOREIGN PATENT DOCUMENTS

CN 109409371 3/2019
CN 111582297 8/2020
(Continued)

OTHER PUBLICATIONS

Le et al., Object removal from complex videos using a few annotations, Computational Visual Media, vol. 5, No. 3, Sep. 2019, pp. 267-291, AAPA furnished vi aIDS.*
(Continued)

*Primary Examiner* — Guillermo M Rivera-Martinez
(74) *Attorney, Agent, or Firm* — IP Spring

(57) ABSTRACT

A media application receives user input that indicates one or more objects to be erased from a media item. The media application translates the user input to a bounding box. The media application provides a crop of the media item based on the bounding box to a segmentation machine-learning model. The segmentation machine-learning model outputs a segmentation mask for one or more segmented objects in the crop of the media item and a corresponding segmentation score that indicates a quality of the segmentation mask.

20 Claims, 12 Drawing Sheets

(52) U.S. Cl.
CPC .................. *G06T 2207/20081* (2013.01);
*G06T 2210/12* (2013.01); *G06T 2210/22* (2013.01)

(58) Field of Classification Search
CPC ....... G06T 2207/20132; G06T 2210/22; G06T 2210/12
See application file for complete search history.

(56) References Cited

U.S. PATENT DOCUMENTS

| | | | | |
|---|---|---|---|---|
| 2018/0005063 | A1* | 1/2018 | Chan | G06V 20/00 |
| 2019/0108640 | A1* | 4/2019 | Zhang | G06N 3/084 |
| 2020/0143171 | A1* | 5/2020 | Lee | G06V 20/49 |
| 2020/0175654 | A1 | 6/2020 | Tagra et al. | |
| 2020/0364871 | A1* | 11/2020 | Bradski | G06T 11/203 |
| 2021/0027539 | A1* | 1/2021 | Huang | G06T 7/194 |
| 2021/0142497 | A1* | 5/2021 | Pugh | G06T 7/194 |

FOREIGN PATENT DOCUMENTS

| | | |
|---|---|---|
| CN | 112241675 | 1/2021 |
| JP | 2000-228722 | 8/2000 |
| KR | 10-2019-0019822 | 2/2019 |

OTHER PUBLICATIONS

Matsui, et al., "Single-Image Fence Removal Using Deep Convolutional Neural Network", IEEE Access 8, 2019, p. 38846-38854.
Banerjee, et al., "Image foreground extraction—a supervised framework based on region transfer", 2016 International Conference on Signal and Information Processing (IConSIP), 2016, pp. 1-5.
JPO, Office Action for Japanese Patent Application No. 2023-561358, Sep. 10, 2024, 6 pages.
USPTO, International Search Report and Written Opinion in International Application No. PCT/US2022/047035, Feb. 2, 2023, 11 pages.
Jonna Sankaraganesh, et al., "Deep Learning Based Fence Segmentation and Removal from an Image Using a Video Sequence", 16th European Conference—Computer Vision—ECCV 2020, Cornell University Library, 201 Olin Library Cornell University Ithaca, NY 14853, Nov. 24, 2016, pp. 836-851.
Le Thuc Trinh, et al., "Object removal from complex videos using a few annotations", Computational Visual Media, vol. 5, No. 3, Aug. 22, 2019, pp. 267-291.
JPO, Notice of Allowance (with English translation) for Japanese Patent Application No. 2023-561358, Apr. 1, 2025, 6 pages.
CNIPA, First Office Action (with English translation) for Chinese Patent Application No. 202280021669.1, May 30, 2025, 18 pages.
IPO, First Examination Report for Indian Patent Application No. 202347065021, Jul. 7, 2025, 6 pages.
KIPO, Office Action (with English translation) for Korean Patent Application No. 10-2023-7032245, Jul. 8, 2025, 14 pages.
Le, Thuc Trinh, et al., "Object removal from complex videos using a few annotations," Computation Visual media, vol. 5, No. 3, Sep. 2019, pp. 267-291.
EPO, Communication under Rule 71(3) EPC for European Patent Application No. 22812866.6, Aug. 26, 2025, 8 pages.

* cited by examiner

PERFORMING SEGMENTATION OF OBJECTS IN MEDIA ITEMS BASED ON USER INPUT

CROSS-REFERENCE TO RELATED APPLICATIONS

The present application claims priority to U.S. Provisional Patent Application No. 63/257,111, filed on Oct. 18, 2021 and titled "Translating User Annotation for Distraction Removal in Media Items," which is incorporated by reference herein in its entirety.

BACKGROUND

The user-perceived quality of visual media items such as images (static images, images with selective motion, etc.) and videos can be improved by removing certain objects that distract from the focus of the media items or otherwise affect the visual appeal of the media item. For example, users sometimes capture pictures or videos that include windmills, people in the background, fences, or other objects that are not part of the main subject that the user intends to capture. For example, a picture may be intended to capture foreground individuals, trees, buildings, landscapes, etc. but one or more distracting objects may be present in the foreground (e.g., a fence, a traffic light, or other object closer to the camera than the objects of interest); in the background (e.g., a person in the background, power lines above the object of interest, or other objects farther away from the camera than the objects of interest); or in the same plane (e.g., a person with their back to the camera, but at a similar distance to the camera as the objects of interest).

Users can employ manual image or video editing techniques to remove distracting objects. However, this task can be arduous and incomplete. Further, automatic removal of a distracting object is difficult since it may result in false positives where additional objects or portions of objects are also removed or incomplete segmentation results in portions of the removed object still being visible.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer-implemented method includes receiving user input that indicates one or more objects to be erased from a media item. The method further includes translating the user input to a bounding box. The method further includes providing a crop of the media item based on the bounding box to a segmentation machine-learning model. The method further includes outputting, with the segmentation machine-learning model, a segmentation mask for one or more segmented objects in the crop of the media item and a corresponding segmentation score that indicates a quality of the segmentation mask.

In some embodiments, the bounding box is an axis-aligned bounding box or an oriented bounding box. In some embodiments, the user input includes one or more strokes made with reference to the media item. In some embodiments, the bounding box is an oriented bounding box and wherein an orientation of the oriented bounding box matches an orientation of at least one of the one or more strokes. In some embodiments, prior to the providing a crop of the media item, the segmentation machine-learning model is trained using training data that includes a plurality of training images and groundtruth segmentation masks. In some embodiments, the method further includes determining that the segmentation mask is invalid based on one or more of: the corresponding segmentation score failing to meet a threshold score, a number of valid mask pixels falling below a threshold number of pixels, a segmentation mask size falling below a threshold size, or the segmentation mask being greater than a threshold distance from a region indicated by the user input and responsive to determining that the segmentation mask is invalid, generating a different mask based on a region within the user input. In some embodiments, the method further includes inpainting a portion of the media item that matches the segmentation mask to obtain an output media item, wherein the one or more objects are absent from the output media item. In some embodiments, the inpainting is performed using an inpainting machine-learning model, and wherein the media item and the segmentation mask are provided as input to the inpainting machine-learning model. In some embodiments, the method further includes providing a user interface that includes the output media item.

In some embodiments, a non-transitory computer-readable medium with instructions stored thereon that, when executed by one or more computers, causes the one or more computers to perform operations, the operations comprising: receiving user input that indicates one or more objects to be erased from a media item, translating the user input to a bounding box, providing a crop of the media item based on the bounding box to a segmentation machine-learning model, and outputting, with the segmentation machine-learning model, and a segmentation mask for one or more segmented objects in the crop of the media item and a corresponding segmentation score that indicates a quality of the segmentation mask.

In some embodiments, the bounding box is an axis-aligned bounding box or an oriented bounding box. In some embodiments, the user input includes one or more strokes made with reference to the media item. In some embodiments, the bounding box is an oriented bounding box and wherein an orientation of the oriented bounding box matches an orientation of at least one of the one or more strokes. In some embodiments, prior to the providing a crop of the media item, the segmentation machine-learning model is trained using training data that includes a plurality of training images and groundtruth segmentation masks.

In some embodiments, a computing device comprises one or more processors and a memory coupled to the one or more processors, with instructions stored thereon that, when executed by the processor, cause the processor to perform operations. The operations may include receiving user input that indicates one or more objects to be erased from a media item, translating the user input to a bounding box, providing a crop of the media item based on the bounding box to a segmentation machine-learning model, and outputting, with the segmentation machine-learning model, a segmentation mask for one or more segmented objects in the crop of the media item and a corresponding segmentation score that indicates a quality of the segmentation mask.

In some embodiments, the bounding box is an axis-aligned bounding box or an oriented bounding box. In some embodiments, the user input includes one or more strokes made with reference to the media item. In some embodiments, the bounding box is an oriented bounding box and wherein an orientation of the oriented bounding box matches an orientation of at least one of the one or more strokes. In some embodiments, prior to the providing a crop of the media item, the segmentation machine-learning model is trained using training data that includes a plurality of training images and groundtruth segmentation masks. In some embodiments, the operations further include determining that the segmentation mask is invalid based on one or more of: the corresponding segmentation score failing to meet a threshold score, a number of valid mask pixels falling below a threshold number of pixels, a segmentation mask size falling below a threshold size, or the segmentation mask being greater than a threshold distance from a region indicated by the user input and responsive to determining that the segmentation mask is invalid, generating a different mask based on a region within the user input.

The techniques described in the specification advantageously describes a media application that determines user intent associated with user input. For example, when a user circles a portion of an image, the media application determines the particular object that the user is requesting be removed.

DETAILED DESCRIPTION

Example Environment 100

Figure 1:
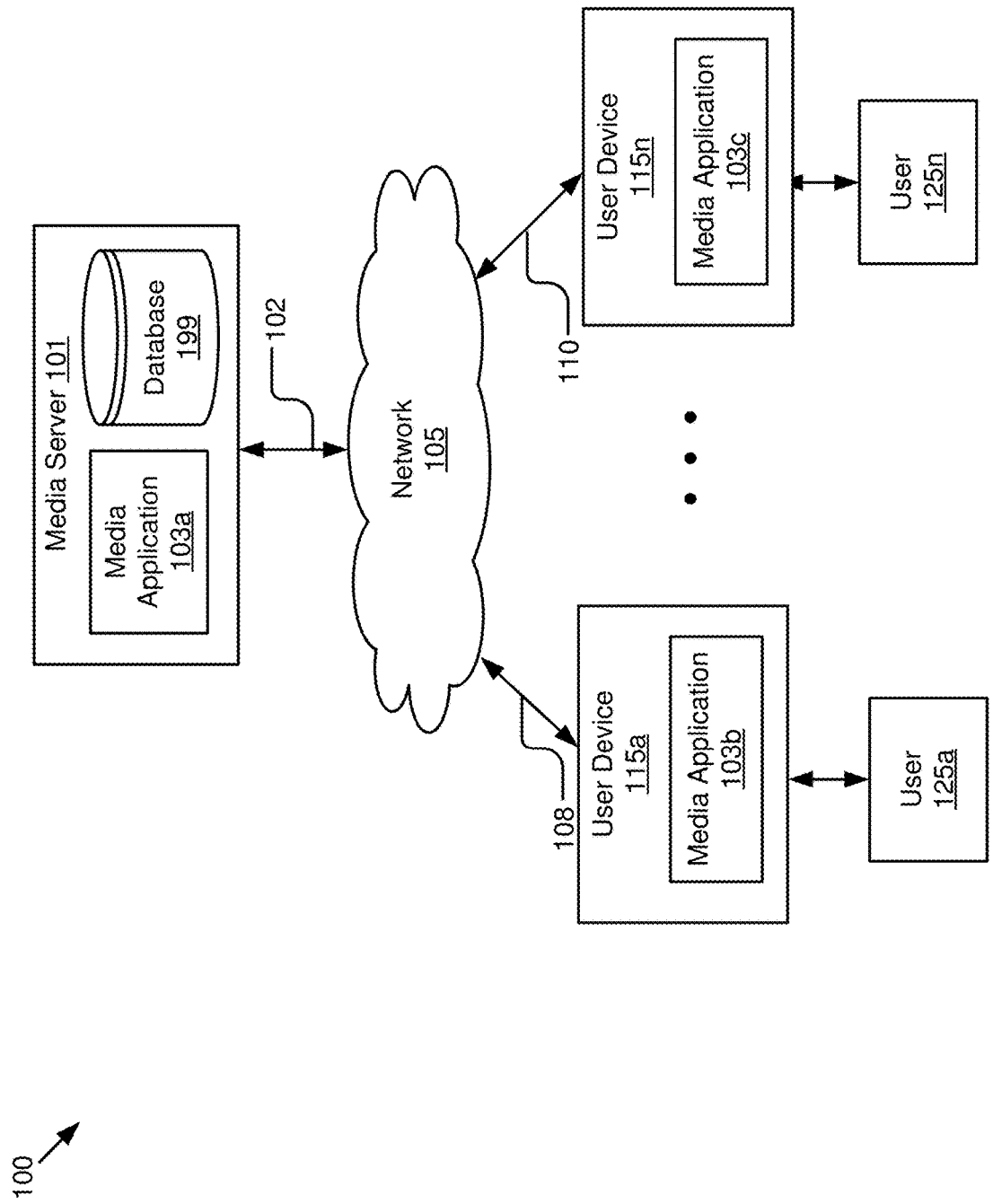
FIG. 1 is a block diagram of an example network environment to remove objects from images, according to some embodiments described herein.

FIG. 1 illustrates a block diagram of an example environment 100. In some embodiments, the environment 100 includes a media server 101, a user device 115a, and a user device 115n coupled to a network 105. Users 125a, 125n may be associated with respective user devices 115a, 115n. In some embodiments, the environment 100 may include other servers or devices not shown in FIG. 1. In FIG. 1 and the remaining figures, a letter after a reference number, e.g., "115a," represents a reference to the element having that particular reference number. A reference number in the text without a following letter, e.g., "115," represents a general reference to embodiments of the element bearing that reference number.

The media server 101 may include a processor, a memory, and network communication hardware. In some embodiments, the media server 101 is a hardware server. The media server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology. In some embodiments, the media server 101 sends and receives data to and from one or more of the user devices 115a, 115n via the network 105. The media server 101 may include a media application 103a and a database 199.

The database 199 may store machine-learning models, training data sets, images, etc. The database 199 may, upon receipt of user consent, store social network data associated with users 125, user preferences for the users 125, etc.

The user device 115 may be a computing device that includes a memory coupled to a hardware processor. For example, the user device 115 may include a mobile device, a tablet computer, a mobile telephone, a wearable device, a head-mounted display, a mobile email device, a portable game player, a portable music player, a reader device, or another electronic device capable of accessing a network 105.

In the illustrated implementation, user device 115a is coupled to the network 105 via signal line 108 and user device 115n is coupled to the network 105 via signal line 110. The media application 103 may be stored as media application 103b on the user device 115a and/or media application 103c on the user device 115n. Signal lines 108 and 110 may be wired connections, such as Ethernet, coaxial cable, fiber-optic cable, etc., or wireless connections, such as Wi-Fi®, Bluetooth®, or other wireless technology. User devices 115a, 115n are accessed by users 125a, 125n, respectively. The user devices 115a, 115n in FIG. 1 are used by way of example. While FIG. 1 illustrates two user devices, 115a and 115n, the disclosure applies to a system architecture having one or more user devices 115.

The media application 103 may be stored on the media server 101 and/or the user device 115. In some embodiments, the operations described herein are performed on the media server 101 or the user device 115. In some embodiments, some operations may be performed on the media server 101 and some may be performed on the user device 115. Performance of operations is in accordance with user settings. For example, the user 125a may specify settings that operations are to be performed on their respective device 115a and not on the server 101. With such settings, operations described herein are performed entirely on user device 115a and no operations are performed on the media server 101. Further, a user 125a may specify that images and/or other data of the user is to be stored only locally on a user device 115a and not on the media server 101. With such settings, no user data is transmitted to or stored on the media server 101. Transmission of user data to the media server 101, any temporary or permanent storage of such data by the media server 101, and performance of operations on such data by the media server 101 are performed only if the user has agreed to transmission, storage, and performance of operations by the media server 101. Users are provided with options to change the settings at any time, e.g., such that they can enable or disable the use of the media server 101.

Machine learning models (e.g., neural networks or other types of models), if utilized for one or more operations, are stored and utilized locally on a user device 115, with specific user permission. Server-side models are used only if permitted by the user. Model training is performed using a synthetic data set, as described below with reference to FIG. 5. Further, a trained model may be provided for use on a user device 115. During such use, if permitted by the user 125, on-device training of the model may be performed. Updated model parameters may be transmitted to the media server 101 if permitted by the user 115, e.g., to enable federated learning. Model parameters do not include any user data.

The media application 103 receives media item. For example, the media application 103 receives a media item from a camera that is part of the user device 115 or the media application 103 receives the media item over the network 105. The media application 103 receives user input that indicates one or more objects to be erased from the media item. For example, the user input is a circle surrounding an object to be removed. The media application 103 translates the user input to a bounding box. The media application 103 provides a crop of the media item based on the bounding box to a segmentation machine-learning model. The segmentation machine-learning model outputs a segmentation mask for one or more segmented objects in the crop of the media item and a corresponding segmentation score that indicates a quality of the segmentation mask. In some embodiments, the media application 103 inpaints a portion of the media item that matches the segmentation mask to obtain an output media item, where the one or more objects are absent from the output media item.

In some embodiments, the media application 103 may be implemented using hardware including a central processing unit (CPU), a field-programmable gate array (FPGA), an application-specific integrated circuit (ASIC), machine learning processor/co-processor, any other type of processor, or a combination thereof. In some embodiments, the media application 103a may be implemented using a combination of hardware and software.

Example Computing Device 200

Figure 2:
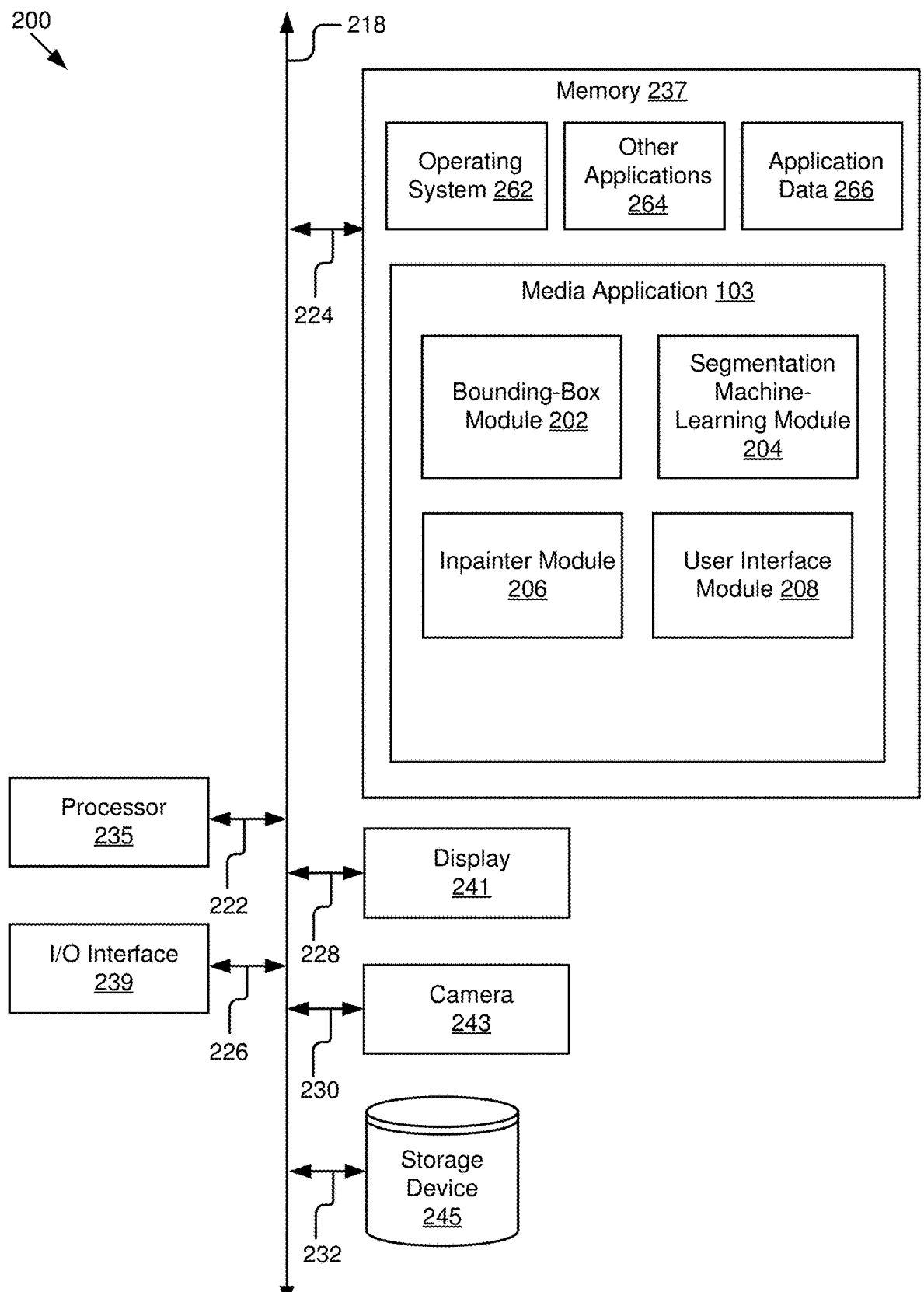
FIG. 2 is a block diagram of an example computing device to remove objects from images, according to some embodiments described herein.

FIG. 2 is a block diagram of an example computing device 200 that may be used to implement one or more features described herein. Computing device 200 can be any suitable computer system, server, or other electronic or hardware device. In one example, computing device 200 is a media server 101 used to implement the media application 103a. In another example, computing device 200 is a user device 115.

In some embodiments, computing device 200 includes a processor 235, a memory 237, an input/output (I/O) interface 239, a display 241, a camera 243, and a storage device 245 all coupled via a bus 218. The processor 235 may be coupled to the bus 218 via signal line 222, the memory 237 may be coupled to the bus 218 via signal line 224, the I/O interface 239 may be coupled to the bus 218 via signal line 226, the display 241 may be coupled to the bus 218 via signal line 228, the camera 243 may be coupled to the bus 218 via signal line 230, and the storage device 245 may be coupled to the bus 218 via signal line 232.

Processor 235 can be one or more processors and/or processing circuits to execute program code and control basic operations of the computing device 200. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems. In some embodiments, processor 235 may include one or more co-processors that implement neural-network processing. In some embodiments, processor 235 may be a processor that processes data to produce probabilistic output, e.g., the output produced by processor 235 may be imprecise or may be accurate within a range from an expected output. Processing need not be limited to a particular geographic location or have temporal limitations. For example, a processor may perform its functions in real-time, offline, in a batch mode, etc. Portions of processing may be performed at different times and at different locations, by different (or the same) processing systems. A computer may be any processor in communication with a memory.

Memory 237 is provided in computing device 200 for access by the processor 235, and may be any suitable processor-readable storage medium, such as random access memory (RAM), read-only memory (ROM), Electrical Erasable Read-only Memory (EEPROM), Flash memory, etc., suitable for storing instructions for execution by the processor or sets of processors, and located separate from processor 235 and/or integrated therewith. Memory 237 can store software operating on the computing device 200 by the processor 235, including a media application 103.

The memory 237 may include an operating system 262, other applications 264, and application data 266. Other applications 264 can include, e.g., an image library application, an image management application, an image gallery application, communication applications, web hosting engines or applications, media sharing applications, etc. One or more methods disclosed herein can operate in several environments and platforms, e.g., as a stand-alone computer program that can run on any type of computing device, as a web application having web pages, as a mobile application ("app") run on a mobile computing device, etc.

The application data 266 may be data generated by the other applications 264 or hardware of the computing device 200. For example, the application data 266 may include images used by the image library application and user actions identified by the other applications 264 (e.g., a social networking application), etc.

I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., memory 237 and/or storage device 245), and input/output devices can communicate via I/O interface 239. In some embodiments, the I/O interface 239 can connect to interface devices such as input devices (keyboard, pointing device, touchscreen, microphone, scanner, sensors, etc.) and/or output devices (display devices, speaker devices, printers, monitors, etc.).

Some examples of interfaced devices that can connect to I/O interface 239 can include a display 241 that can be used to display content, e.g., images, video, and/or a user interface of an output application as described herein, and to receive touch (or gesture) input from a user. For example, display 241 may be utilized to display a user interface that includes a graphical guide on a viewfinder. Display 241 can include any suitable display device such as a liquid crystal display (LCD), light emitting diode (LED), or plasma display screen, cathode ray tube (CRT), television, monitor, touchscreen, three-dimensional display screen, or other visual display device. For example, display 241 can be a flat display screen provided on a mobile device, multiple display screens embedded in a glasses form factor or headset device, or a monitor screen for a computer device.

Camera 243 may be any type of image capture device that can capture media items, including images and/or video. In some embodiments, the camera 243 captures images or video that the I/O interface 239 provides to the media application 103.

The storage device 245 stores data related to the media application 103. For example, the storage device 245 may store a training data set that includes labeled images, a machine-learning model, output from the machine-learning model, etc.

FIG. 2 illustrates an example media application 103, stored in memory 237, that includes a bounding-box module 202, a segmentation machine-learning module 204, an inpainter module 206, and a user interface module 208.

The bounding-box module 202 generates bounding boxes. In some embodiments, the bounding-box module 202 includes a set of instructions executable by the processor 235 to generate the bounding boxes. In some embodiments, the bounding-box module 202 is stored in the memory 237 of the computing device 200 and can be accessible and executable by the processor 235.

In some embodiments, the bounding-box module 202 receives a media item. The media item may be received from the camera 243 of the computing device 200, from application data 266, or from the media server 101 via the I/O interface 239. In various embodiments, the media item may be an image, a video, a series of images (e.g., a GIF), etc.

In some implementations, the media item includes user input that indicates one or more objects to be erased from the media item. In some implementations, the user input may be received at a client device 110 as touch input via a touchscreen, input via a mouse/trackpad/other pointing device, or other suitable input mechanism. In some implementations, the user input is received with reference to a particular media item. In some embodiments, the user input is a manually-drawn stroke that surrounds or is on top of an object to be erased from the media item. For example, the user input may be a circle that surrounds the object, a line or a series of lines on top of the object, a square that surrounds the object, etc. The user input may be provided on the computing device 200 by a user drawing on a touchscreen using their finger or a stylus, by mouse or pointer input, gesture input (e.g., detected by a camera), etc.

Figure 3A:
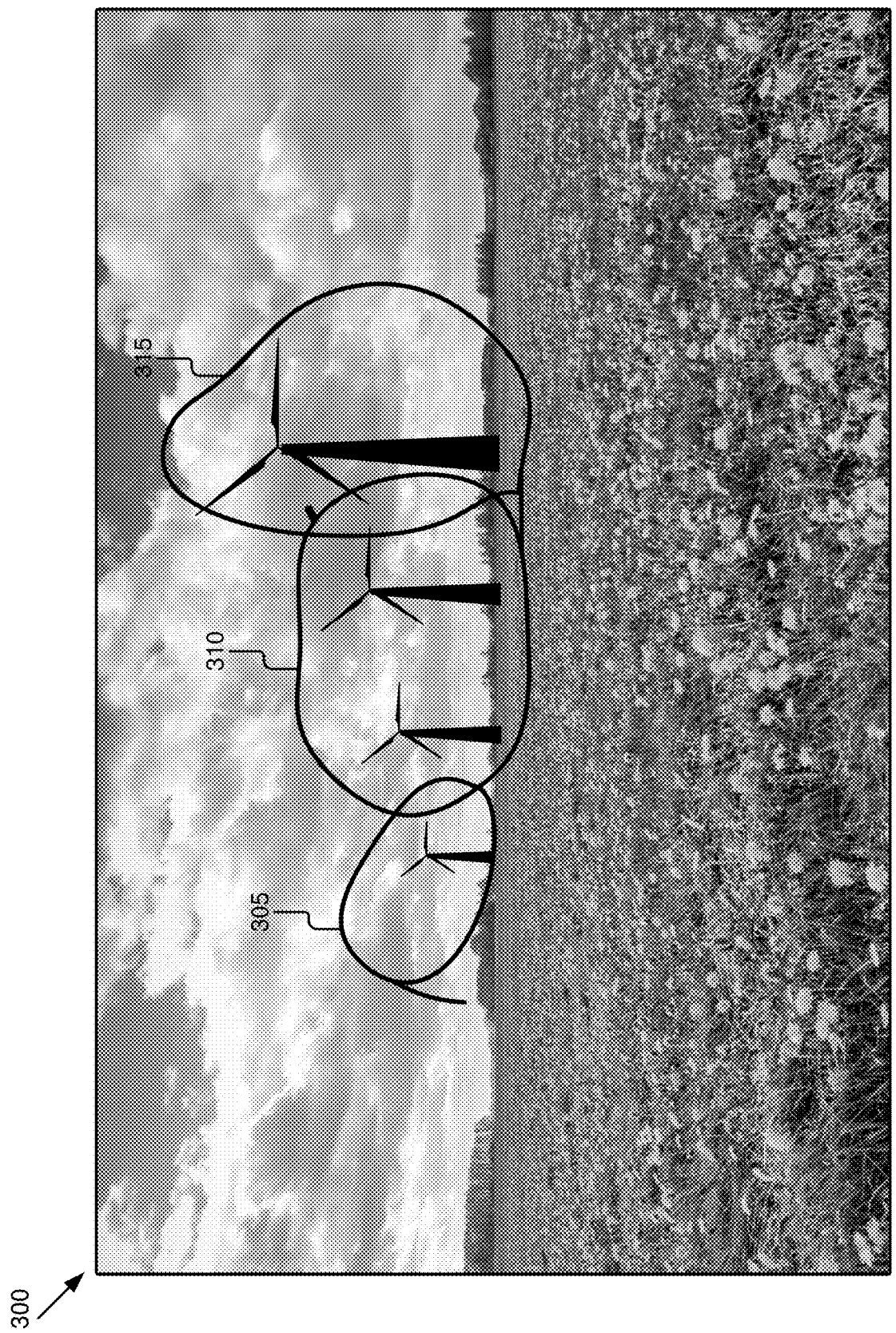
FIG. 3A illustrates an example image with user input for removing objects, according to some embodiments described herein.

Turning to FIG. 3A, an example image 300 with user input for removing objects is illustrated. In this example, the media is an image of a dandelion field with windmills in the background. User input includes roughly circular shapes 305, 310, and 315 that surround the objects to be removed. User input 305 surrounds a first windmill, user input 310 surrounds two windmills, and user input 315 surrounds a fourth windmill.

In some embodiments, the bounding-box module 202 translates the user input to a bounding box. The bounding-box module 202 identifies objects associated with the user input. For example, in FIG. 3A the bounding-box module 202 identifies that user input 305 is associated with the windmill that is encircled by the user input 305. In some embodiments, where the user input may include multiple objects, the bounding-box module 202 identifies a percentage of the objects that is associated with the user input. For example, user input 310 encircles almost all pixels of the image corresponding to the two windmills. As a result, the bounding-box module 202 associates user input 310 with two windmills. In some embodiments, where the user input does not enclose all of an object, the bounding-box module 202 determines whether the amount of user input associated with an object exceeds a threshold percentage of the object (e.g., measured in terms of pixels). For example, user input 315 includes all of the windmill except one of the blades and the percentage is 85%, which exceeds a 70% threshold percentage.

In some embodiments, the bounding-box module 202 identifies objects associated with the user input and compares the identity of the objects to a list of commonly-removed objects to determine whether the user input includes a particular object. For example, the list of commonly-removed objects may include people, powerlines, scooters, trash cans, etc. If the user input surrounds both a person in the background and a portion of a tree, the bounding-box module 202 may determine that the user input corresponds to the person and not the tree because only people and not trees are part of the list of commonly-removed objects.

The bounding-box module 202 generates a bounding box that includes the one or more objects. In some embodiments, the bounding box is a rectangular-shaped bounding box that encompasses all pixels for the one or more objects. In some embodiments, the bounding-box module 202 uses a suitable machine-learning algorithm, such as a neural network or more specifically, a convolutional neural network, to identify the one or more objects and generate the bounding box. The bounding box is associated with x- and y-coordinates for the media item (image or video).

Figure 3B:
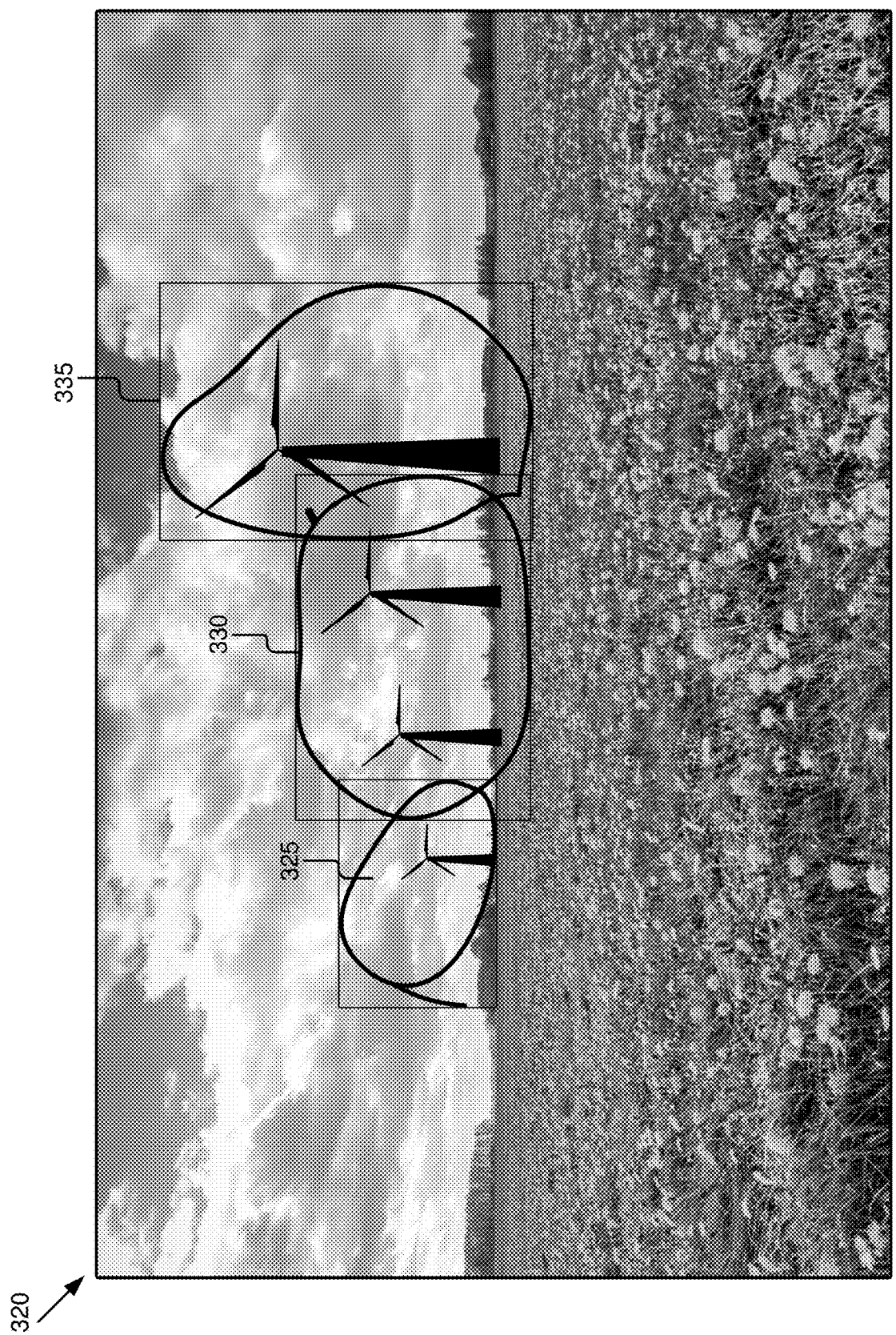
FIG. 3B illustrates an example image with axis-aligned bounding boxes, according to some embodiments described herein.

In some embodiments, the bounding-box module 202 translates the user input to an axis-aligned bounding box or an oriented bounding box. An axis-aligned bounding box is aligned with the x-axis and the y-axis of the media item. In some embodiments, the axis-aligned bounding box is fits tightly around the stroke such that the edges of the bounding box touch the widest parts of the stroke. The axis-aligned bounding box is the smallest box that includes the object indicated by the user input. Turning to FIG. 3B, an example image 310 with axis-aligned bounding boxes is illustrated. The bounding boxes 325, 330, and 335 each include one or more respective objects and the bounding boxes 325, 330, and 335 enclose the corresponding user input strokes.

In FIG. 3B, the three strokes of user input were converted into three bounding boxes, but other embodiments are possible, such as four bounding boxes where each bounding box corresponds to a respective object and fits tightly around the stroke except for the regions where multiple objects are separated. For example, bounding box 330 may be divided into two boxes with the outermost lines of the strokes aligned with the bounding boxes and one or more additional lines in the center to indicate the separation between the objects.

In some embodiments, the bounding-box module 202 generates an oriented bounding box where the orientation of the oriented bounding box matches an orientation of the strokes. For example, the oriented bounding box may be applied by the bounding box module 202 when the user input is in one direction, such as when the user provides one or more lines on the media item. In some embodiments, the bounding-box module 202 generates an oriented bounding box that fits tightly around the stroke that can be rotated with regard to the image axes. In some embodiments, an oriented bounding box is any bounding box where the faces and edges of the bounding box are not parallel to the edges of the media item.

In some embodiments, the bounding-box module 202 generates a crop of the bounding box based on the bounding box. For example, the bounding-box module 202 generates a crop that uses coordinates for the bounding box to generate a crop that includes the one or more objects within the bounding box.

In some embodiments, the segmentation machine-learning module 204 includes (and optionally, also performs training for) a trained model that is herein referred to as a segmentation machine-learning model. In some embodiments, the segmentation machine-learning module 204 is configured to apply the machine-learning model to input data, such as application data 266 (e.g., a media item captured by the user device 115), and to output a segmentation mask. In some embodiments, the segmentation machine-learning module 204 may include code to be executed by processor 235. In some embodiments, the segmentation machine-learning module 204 is stored in the memory 237 of the computing device 200 and can be accessible and executable by the processor 235.

In some embodiments, the segmentation machine-learning module 204 may specify a circuit configuration (e.g., for a programmable processor, for a field programmable gate array (FPGA), etc.) enabling processor 235 to apply the machine-learning model. In some embodiments, the segmentation machine-learning module 204 may include software instructions, hardware instructions, or a combination. In some embodiments, the segmentation machine-learning module 204 may offer an application programming interface (API) that can be used by the operating system 262 and/or other applications 264 to invoke the segmentation machine-learning module 204, e.g., to apply the machine-learning model to application data 266 to output the segmentation mask.

The segmentation machine-learning module 204 uses training data to generate a trained segmentation machine-learning model. For example, training data may include training images and groundtruth segmentation masks. The training images may be crops of bounding boxes that are manually segmented and/or crops of bounding boxes of synthetic images. In some embodiments, segmentation machine-learning module 204 trains the segmentation machine-learning model using axis-aligned bounding boxes or oriented bounding boxes.

In some embodiments, the training data may include synthetic data generated for the purpose of training, such as data that is not based on activity in the context that is being trained, e.g., data generated from simulated or computer-generated images/videos, etc. The training data may include synthetic images of crops of bounding boxes of synthetic images. In some embodiments, the synthetic images are generated by superimposing a two-dimensional object or a three-dimensional object onto a background image. The three-dimensional object may be rendered from a particular view to transform the three-dimensional object into a two-dimensional object.

Training data may be obtained from any source, e.g., a data repository specifically marked for training, data for which permission is provided for use as training data for machine learning, etc. In some embodiments, the training may occur on the media server 101 that provides the training data directly to the user device 115, the training occurs locally on the user device 115, or a combination of both.

In some embodiments, the segmentation machine-learning module 204 uses weights that are taken from another application and are unedited/transferred. For example, in these embodiments, the trained model may be generated, e.g., on a different device, and be provided as part of the media application 103. In various embodiments, the trained model may be provided as a data file that includes a model structure or form (e.g., that defines a number and type of neural network nodes, connectivity between nodes and organization of the nodes into a plurality of layers), and associated weights. The segmentation machine-learning module 204 may read the data file for the trained model and implement neural networks with node connectivity, layers, and weights based on the model structure or form specified in the trained model.

The trained machine-learning model may include one or more model forms or structures. For example, model forms or structures can include any type of neural-network, such as a linear network, a deep-learning neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that receives as input sequential data, such as words in a sentence, frames in a video, etc. and produces as output a result sequence), etc.

The model form or structure may specify connectivity between various nodes and organization of nodes into layers. For example, nodes of a first layer (e.g., an input layer) may receive data as input data or application data. Such data can include, for example, one or more pixels per node, e.g., when the trained model is used for analysis, e.g., of an initial image. Subsequent intermediate layers may receive as input, output of nodes of a previous layer per the connectivity specified in the model form or structure. These layers may also be referred to as hidden layers. For example, a first layer may output a segmentation between a foreground and a background. A final layer (e.g., output layer) produces an output of the machine-learning model. For example, the output layer may receive the segmentation of the initial image into a foreground and a background and output whether a pixel is part of a segmentation mask or not. In some embodiments, model form or structure also specifies a number and/or type of nodes in each layer.

In different embodiments, the trained model can include one or more models. One or more of the models may include a plurality of nodes, arranged into layers per the model structure or form. In some embodiments, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some embodiments, the computation performed by a node may also include applying a step/activation function to the adjusted weighted sum. In some embodiments, the step/activation function may be a nonlinear function. In various embodiments, such computation may include operations such as matrix multiplication. In some embodiments, computations by the plurality of nodes may be performed in parallel, e.g., using multiple processors cores of a multicore processor, using individual processing units of a graphics processing unit (GPU), or special-purpose neural circuitry. In some embodiments, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM).

In some embodiments, the trained model may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using training data, to produce a result.

Training may include applying supervised learning techniques. In supervised learning, the training data can include a plurality of inputs (e.g., manually annotated segments and synthesized media items) and corresponding groundtruth output for each input (e.g., a groundtruth segmentation mask that correctly identifies the one or more objects to be removed from each stroke in the media item). Based on a comparison of the output of the model with the groundtruth output, values of the weights are automatically adjusted, e.g., in a manner that increases a probability that the model produces the groundtruth output for the media item.

In some embodiments, during training the segmentation machine-learning module 204 outputs a segmentation mask along with a segmentation score that indicates a quality of the segmentation mask that identifies the objects to be erased in a media item. The segmentation score may reflect an intersection of union (IoU) between the segmentation mask output by the segmentation machine-learning model and a groundtruth segmentation mask.

In various embodiments, a trained model includes a set of weights, or embeddings, corresponding to the model structure. In some embodiments, the trained model may include a set of weights that are fixed, e.g., downloaded from a server that provides the weights. In various embodiments, a trained model includes a set of weights, or embeddings, corresponding to the model structure. In embodiments where data is omitted, the segmentation machine-learning module 204 may generate a trained model that is based on prior training, e.g., by a developer of the segmentation machine-learning module 204, by a third-party, etc. In some embodiments, the trained model may include a set of weights that are fixed, e.g., downloaded from a server that provides the weights.

In some embodiments, the segmentation machine-learning module 204 receives a crop of a media item. The segmentation machine-learning module 204 provides the crop of the media item as input to the trained machine-learning model. In some embodiments, the trained machine-learning model outputs a segmentation mask for one or more segmented objects in the crop of the media item and a corresponding segmentation score that indicates a quality of the segmentation mask. In some embodiments, the segmentation score is based on segmentation scores generated during training of the machine-learning model that reflected an IoU between segmentation masks output by the machine-learning model and groundtruth segmentation masks. In some embodiments, the segmentation score is a number out of a total number, such as 40/100. Other representations of the segmentation score are possible.

In some embodiments, the segmentation machine-learning model outputs a confidence value for each segmentation mask output by the trained machine-learning model. The confidence value may be expressed as a percentage, a number from 0 to 1, etc. For example, the machine-learning model outputs a confidence value of 85% for a confidence that a segmentation mask correctly covered the object identified in the user input.

In some embodiments, the segmentation machine-learning module 204 determines that the segmentation mask was not generated successfully. For example, the segmentation score may fail to meet a threshold score. In another example, the segmentation machine-learning module 204 may determine a number of valid mask pixels and determine that the number falls below a threshold number of pixels. In another example, the segmentation machine-learning module 204 may determine a size of the segmentation mask and that the segmentation mask size falls below a threshold size. In yet another example, the segmentation machine-learning module 204 may determine a distance between the segmentation mask and a region indicated by the user input and that the distance is greater than a threshold distance. In one or more of these instances, the segmentation machine-learning module 204 outputs a different segmentation mask based on a region within the user input.

Figure 3C:
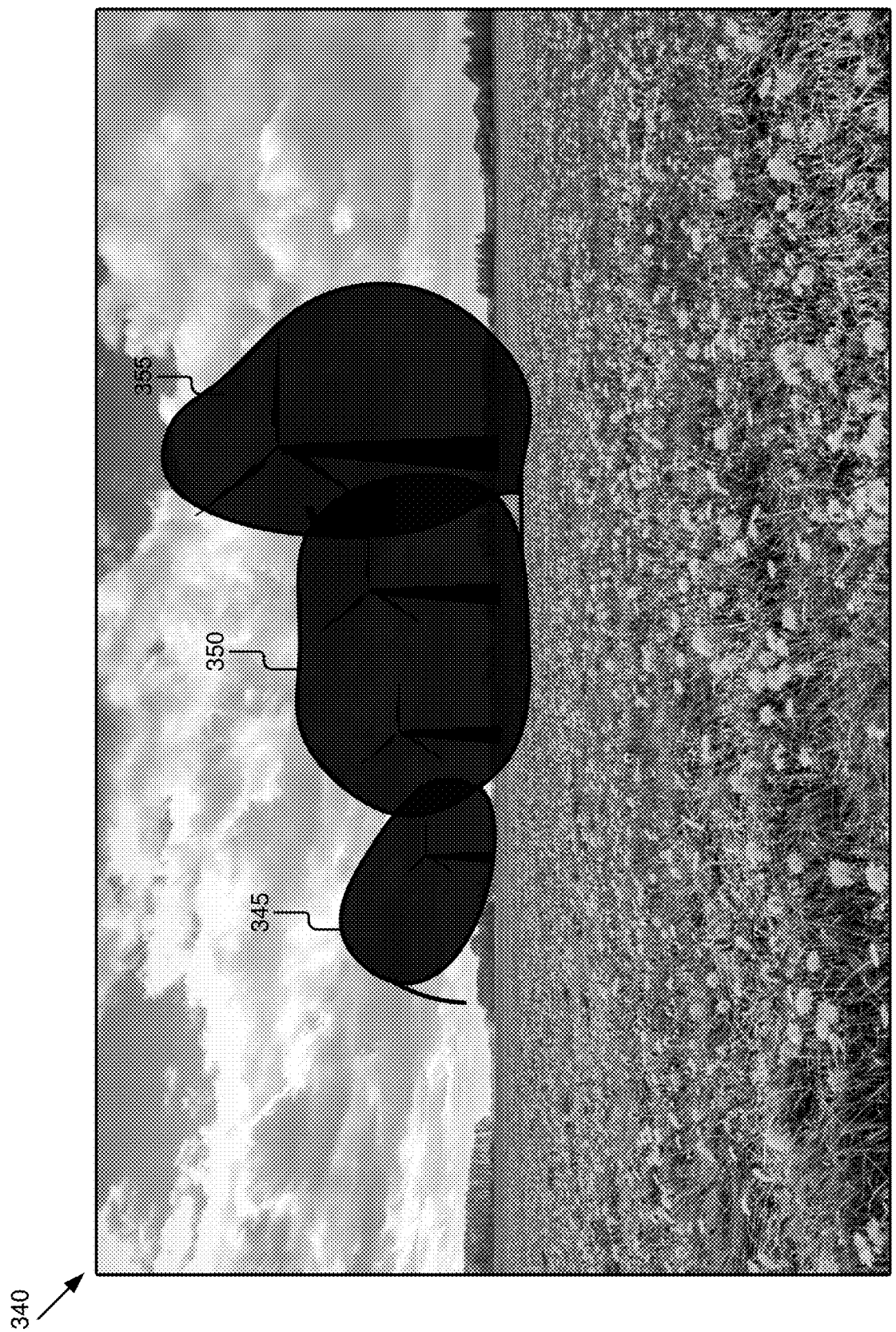
FIG. 3C illustrates an example image with different segmentation masks, according to some embodiments described herein.

Turning to FIG. 3C, an example image 340 is illustrated with different segmentation masks 345, 350, 355. In this example, the segmentation machine-learning module 204 outputs different segmentation masks that include the pixels that correspond to the region within the user input.

The inpainter module 206 generates an output media item from which the one or more objects are absent (erased from the source media item). In some embodiments, the inpainter module 206 includes a set of instructions executable by the processor 235 to generate the output media item. In some embodiments, the inpainter module 206 is stored in the memory 237 of the computing device 200 and can be accessible and executable by the processor 235.

Figure 3D:
FIG. 3D illustrates an example image with the objects removed, according to some embodiments described herein.

In some embodiments, the inpainter module 206 receives a segmentation mask from the segmentation machine-learning module 204. The inpainter module 206 performs inpainting of a portion of the media item that matches the segmentation mask. For example, the inpainter module 206 replaces pixels within the segmentation mask with pixels that match a background in the media item. In some embodiments, the pixels that match a background may be based on another media item of the same location. FIG. 3D illustrates an example inpainted image 360 where the objects are absent from the output media item after the inpainting.

In some embodiments, the inpainter module 206 trains an inpainting machine-learning model to receive the media item and a segmentation mask from the segmentation machine-learning module 204 as input and to output an output media item with the one or more objects absent from the output media item.

The user interface module 208 generates a user interface. In some embodiments, the user interface module 208 includes a set of instructions executable by the processor 235 to generate the user interface. In some embodiments, the user interface module 208 is stored in the memory 237 of the computing device 200 and can be accessible and executable by the processor 235.

Figure 5:
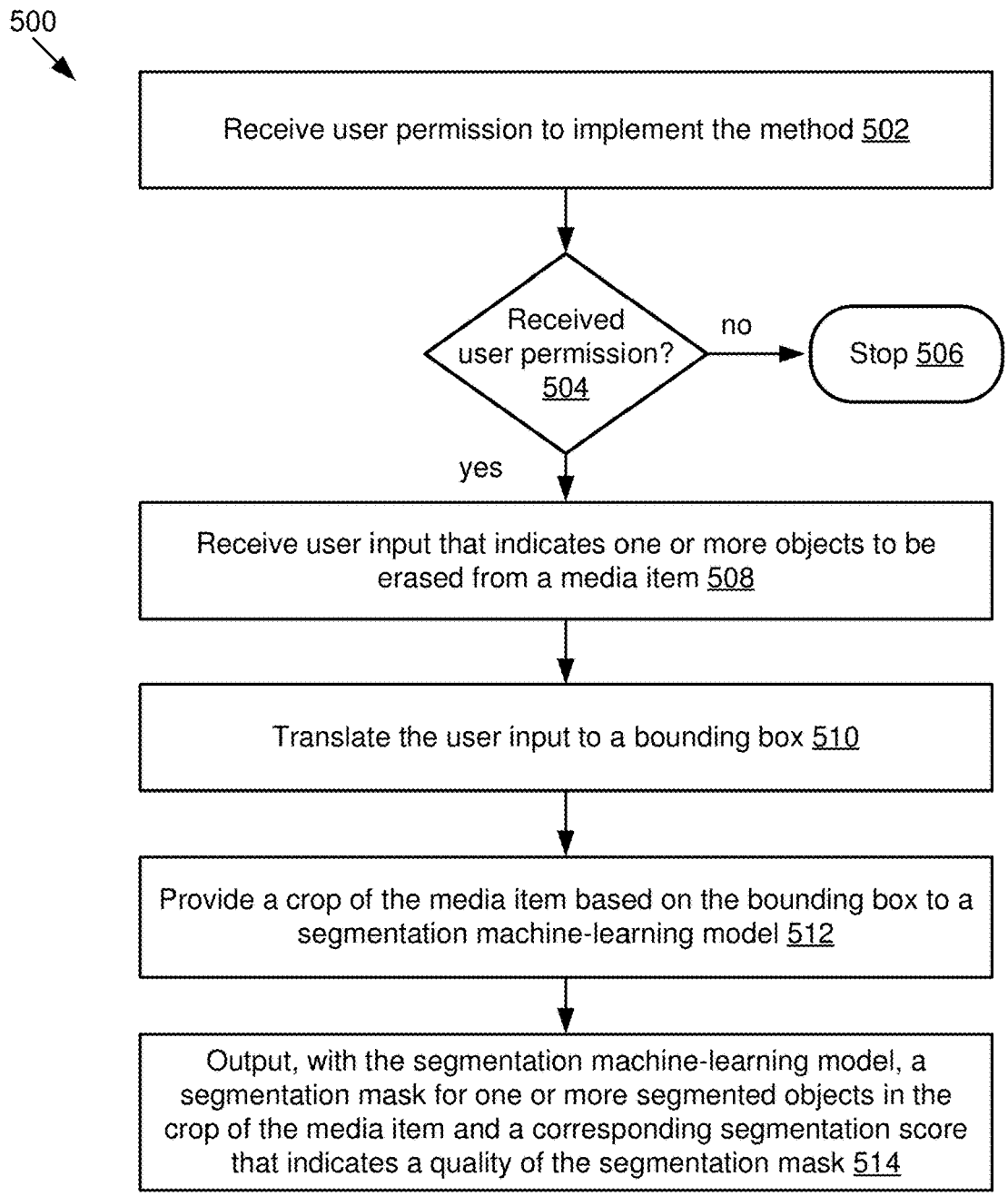
FIG. 5 illustrates a flowchart of an example method to generate a segmentation mask, according to some embodiments described herein.

The user interface module 208 generates a user interface that asks a user for permission to access the user's media items before performing any of the steps performed by the modules in FIG. 2 and the steps described in FIG. 5.

The user interface module 208 generates a user interface that includes a media item and accepts user input for identifying one or more objects for removal. For example, the user interface accepts touch input of a stroke. The user input is indicative of a distracting (or otherwise problematic) object that the user indicates for removal from a media item. For example, the media item may be an image of a family at the beach and the distracting object may be two people walking along the edge of the beach in the background. The user may circle the two people walking along the edge of the beach using the user interface.

The user interface module 208 generates a user interface that includes the output media item that was inpainted. Continuing with the example, the media item is the family at the beach without the two people walking along the edge of the beach. In some embodiments, the output media item may be labelled (visually) or marked (in code, e.g., steganographically) to indicate that the media item was edited to erase the one or more objects. In some embodiments, the user interface includes options for editing the output media item, sharing the output media item, adding the output media item to a photo album, etc. Options for editing the output media item may include the ability to undo the erasure of an object.

In some embodiments, the output media item may be labelled (visually) or marked (in code, e.g., stenographically) to indicate that the media item was edited to erase the one or more objects.

In some embodiments, the user interface module 208 receives feedback from a user on the user device 115. The feedback may take the form of a user that posts the output media item, that deletes the output media item, that shares the output media item, etc.

Example Oriented Bounding Box

Figure 4A:
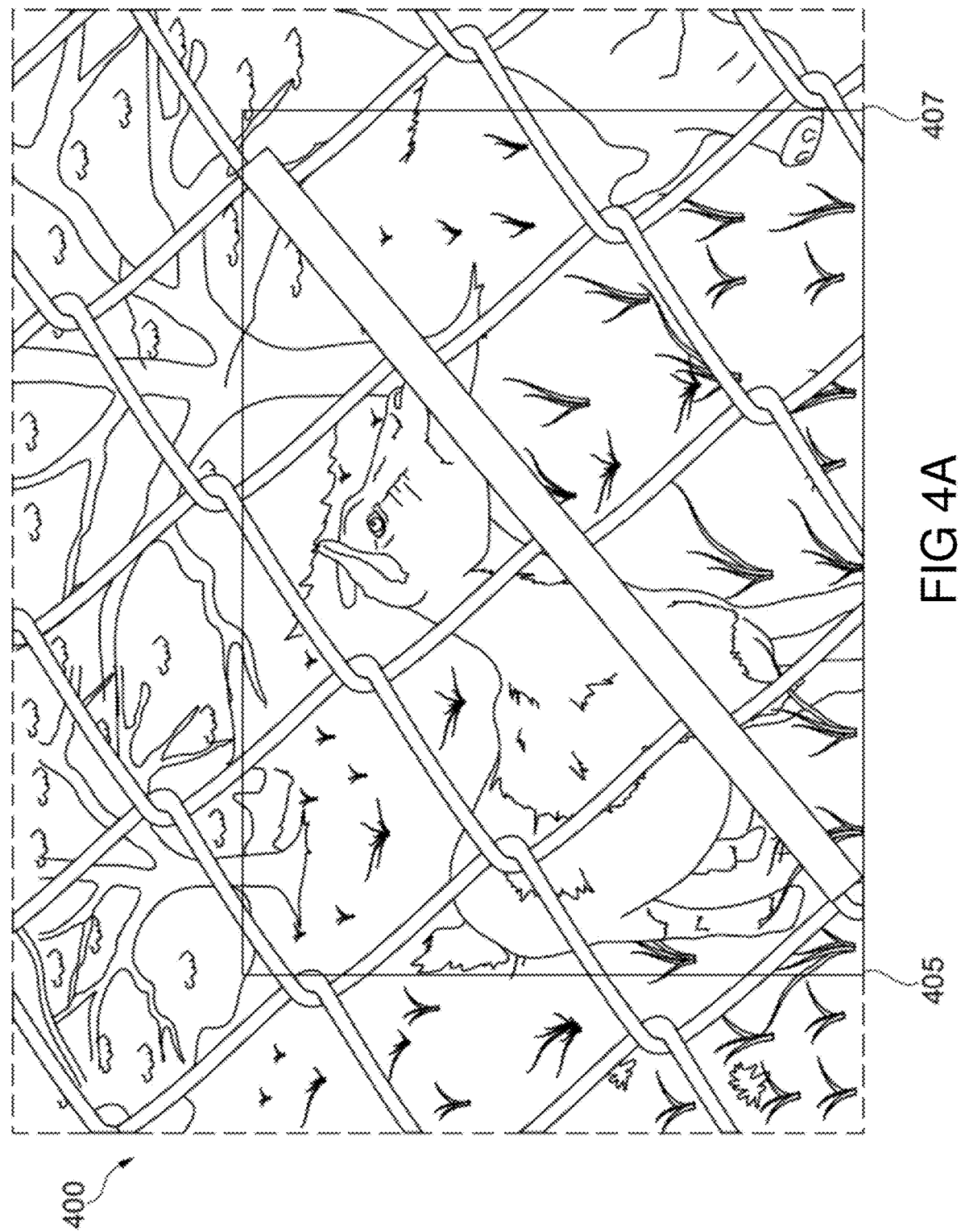
FIG. 4A illustrates an example image of a goat with user input to remove a segment of a fence, according to some embodiments described herein.

FIG. 4A illustrates an example image 400 of a goat with user input to remove a segment of a fence, according to some embodiments described herein. The bounding-box module 202 receives the user input and generates an oriented bounding box. The orientation of the oriented bounding box is determined based on the orientation of the user input. In FIG. 4A the user input 405 is a stroke along the diagonal line of the chain-link fence. The bounding box 407 is an axis-aligned bounding box.

Figure 4B:
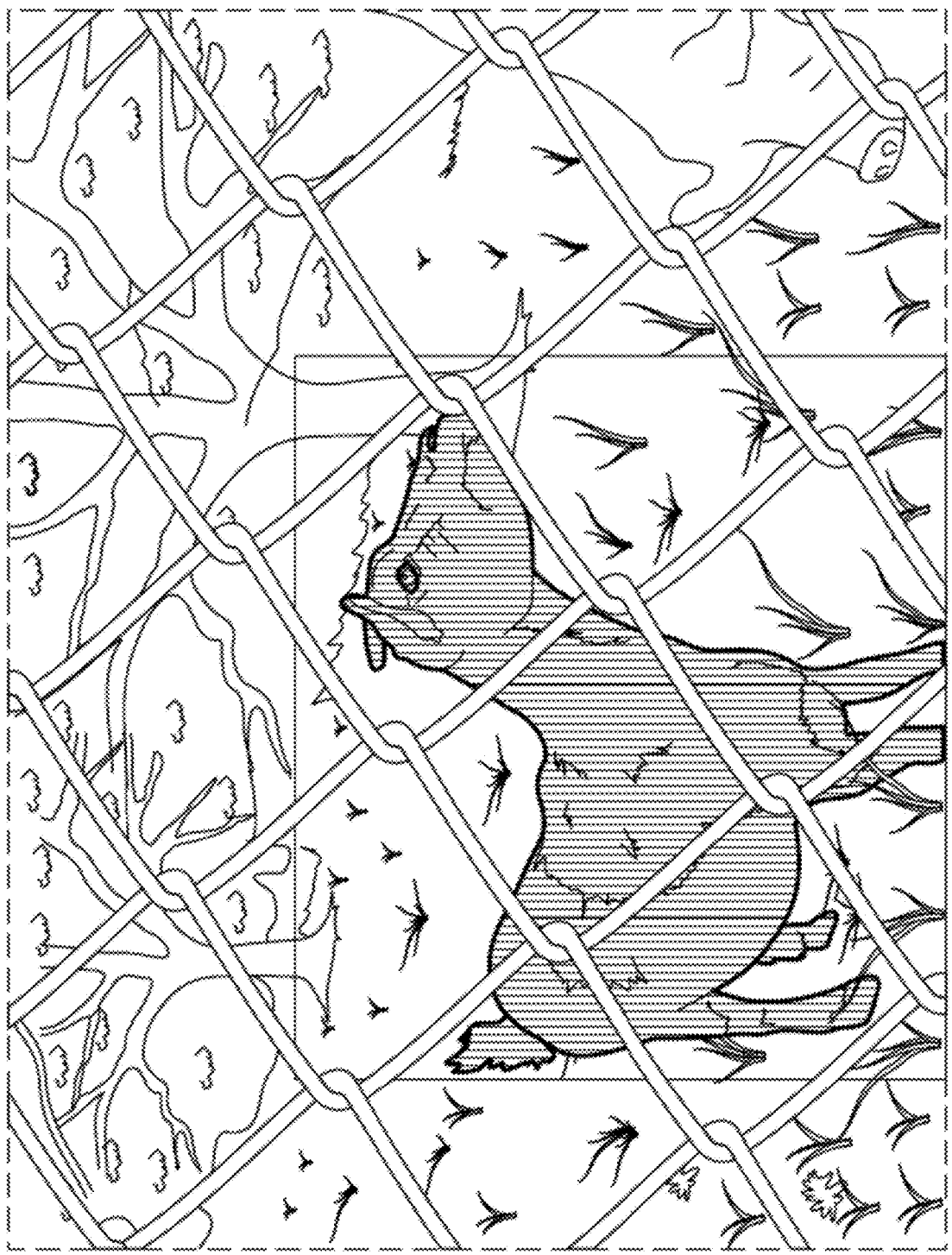
FIG. 4B illustrates an example image with an incorrect bounding box, according to some embodiments described herein.

FIG. 4B illustrates an example image 410 with an incorrect bounding box, according to some embodiments described herein. Because the axis-aligned bounding box is a rectangular box with its sides aligned with the x-axis and the y-axis, the bounding box improperly identifies the goat as the object for removal instead of the chain-link fence that was identified for removal by the user input.

Figure 4C:
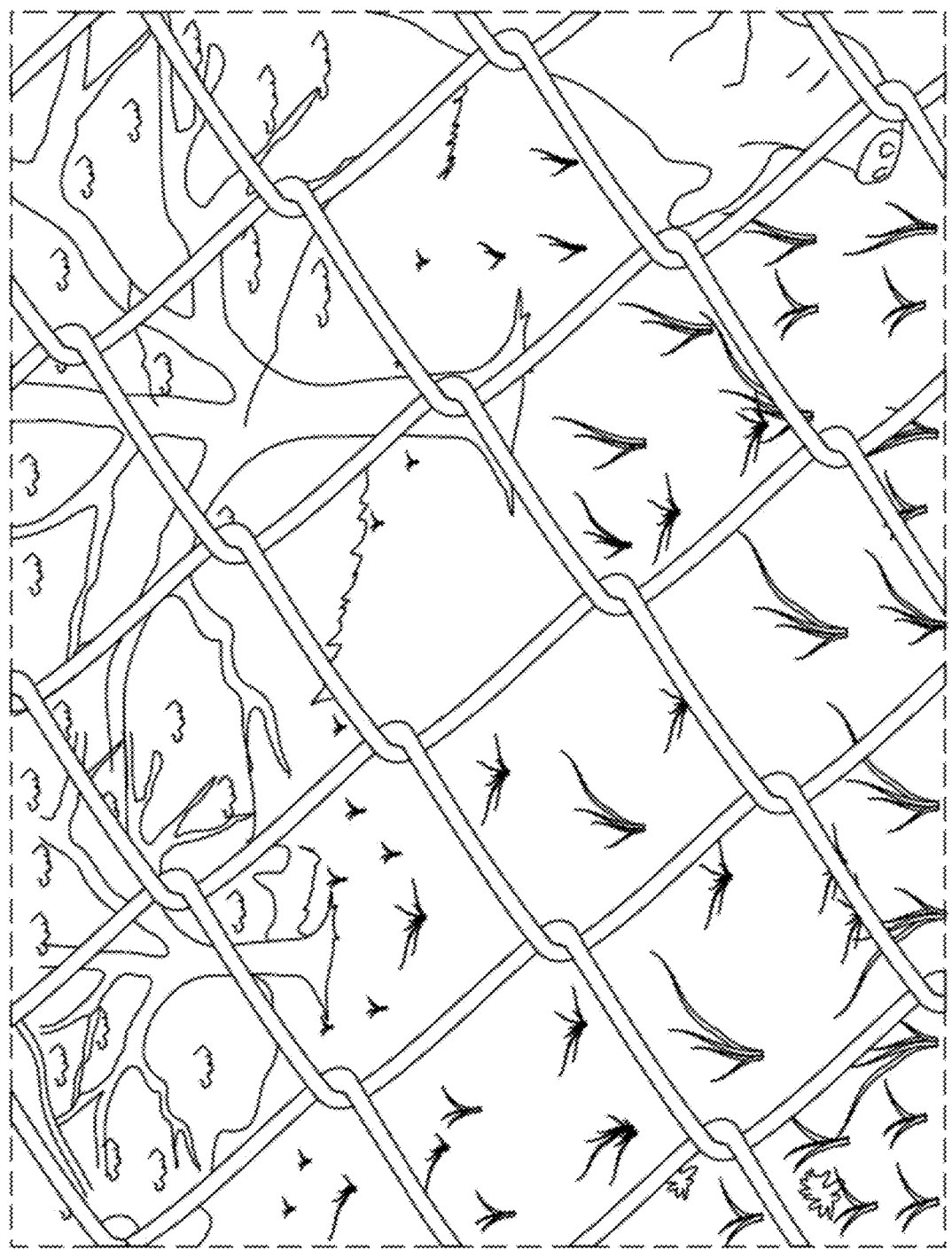
FIG. 4C illustrates an example image where the goat is removed from the media item, according to some embodiments described herein.

FIG. 4C illustrates an example image 420 where the goat is removed from the media item.

Figure 4D:
FIG. 4D illustrates an example image with an oriented bounding box that properly identifies the fence as the object for removal, according to some embodiments described herein.

FIG. 4D illustrates an example image 430 where the bounding-box module 202 uses an oriented bounding box that properly identifies the fence as the object for removal. As illustrated in FIG. 4D, when the segmentation machine-learning module 204 receives the cropped version of the oriented bounding box, the resulting segmentation mask more closely captures the user intent to remove a portion of the chain-link fence than when the segmentation machine-learning module 204 receives the cropped version of the axis-aligned bounding box, which incorrectly interpreted the user intent as being to select the goat behind the chain-link fence.

Figure 4E:
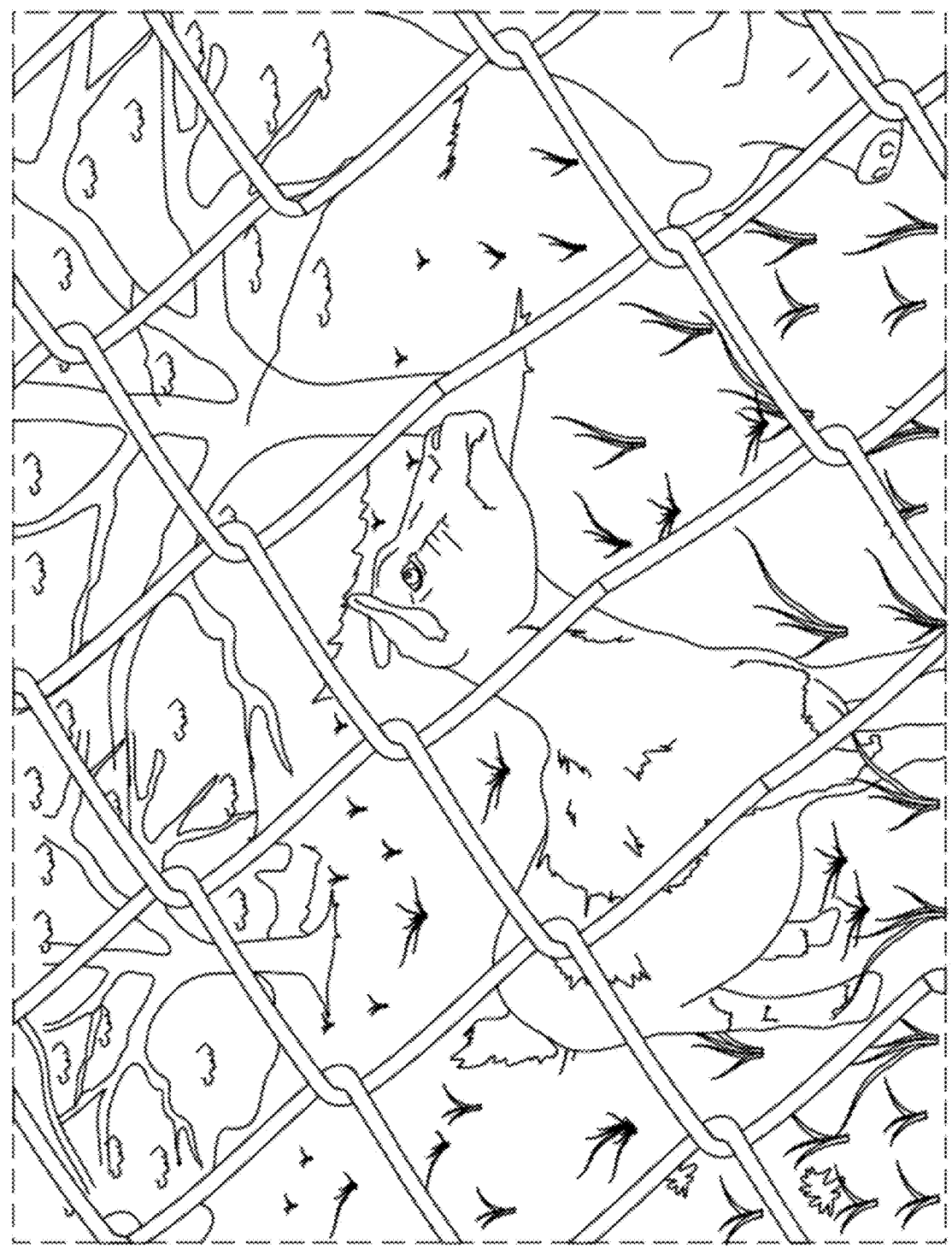
FIG. 4E illustrates an example image where the segment of the fence was correctly removed, according to some embodiments described herein.

FIG. 4E illustrates an example image 440 where the segment of the fence was correctly removed, according to some embodiments described herein.

Example Method 500

FIG. 5 illustrates a flowchart of an example method 500 to generate a segmentation mask. The method 500 of FIG. 5 may begin at block 502. The method 500 illustrated in the flowchart may be performed by the computing device 200 in FIG. 2. In some embodiments, the method 500 is performed by the user device 115, the media server 101, or in part on the user device 115 and in part on the media server 101.

At block 502, user permission is received to implement the method 500. For example, a user may load an application in order to provide user input by circling objects in the media item; but before the media item is displayed the user interface asks for user permission to access a media item associated with the user. The user interface may also ask for permission to modify the media item, to enable the user to permit access to only specific media items, to ensure that no media items are stored or transferred to servers without user permission, etc. Block 502 may be followed by block 504.

At block 504, it is determined whether user permission was received. If no user permission was received, block 504 is followed by block 506, which stops the method 500. If user permission was received, block 504 is followed by block 508.

At block 508, user input is received that indicates one or more objects to be erased from a media item. For example, the image may include a trash can in the background and the user input is a circle around the trash can. Block 508 may be followed by block 510.

At block 510, the user input is translated to a bounding box. For example, the bounding box may be an axis-aligned bounding box or an oriented bounding box. Block 510 may be followed by block 512.

At block 512, a crop of the media item is provided based on the bounding box to a segmentation machine-learning model. Block 506 may be followed by block 514.

At block 514, a segmentation mask is output with the trained segmentation machine-learning model for one or more segmented objects in the crop of the media item and a corresponding segmentation score that indicates a quality of the segmentation mask.

Further to the descriptions above, a user may be provided with controls allowing the user to make an election as to both if and when systems, programs, or features described herein may enable collection of user information e.g., information about a user's media items including images and/or videos, social network, social actions, or activities, profession, a user's preferences (e.g., with respect to objects in images), or a user's current location), and if the user is sent content or comms cations from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks. RAMs, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements, in some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, stoic, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A computer-implemented method comprising:
receiving user input that indicates one or more objects to be erased from a media item;
translating the user input to a bounding box;
providing a crop of the media item based on the bounding box to a segmentation machine-learning model;
outputting, with the segmentation machine-learning model, a segmentation mask for one or more segmented objects in the crop of the media item and a corresponding segmentation score that indicates a quality of the segmentation mask;
determining that the segmentation mask is invalid based on one or more of: the corresponding segmentation score failing to meet a threshold score, a number of valid mask pixels falling below a threshold number of pixels, a segmentation mask size falling below a threshold size, or the segmentation mask being greater than a threshold distance from a region indicated by the user input; and
responsive to determining that the segmentation mask is invalid, generating a different mask based on a region within the user input.

2. The method of claim 1, wherein the bounding box is an axis-aligned bounding box or an oriented bounding box.

3. The method of claim 1, wherein the user input includes one or more strokes made with reference to the media item.

4. The method of claim 3, wherein the bounding box is an oriented bounding box and wherein an orientation of the oriented bounding box matches an orientation of at least one of the one or more strokes.

5. The method of claim 1, wherein prior to the providing the crop of the media item, the segmentation machine-learning model is trained using training data that includes a plurality of training images and groundtruth segmentation masks.

6. The method of claim 1, further comprising:
providing a user interface that receives the user input, wherein the user input is selected from a group of a circle that surrounds the one or more objects, one or more lines on top of the one or more objects, a square that surrounds the one or more objects, and combinations thereof.

7. The method of claim 1, further comprising inpainting a portion of the media item that matches the different mask to obtain an output media item, wherein the one or more objects are absent from the output media item.

8. The method of claim 7, wherein the inpainting is performed using an inpainting machine-learning model, and wherein the media item and the different mask are provided as input to the inpainting machine-learning model.

9. The method of claim 7, further comprising providing a user interface that includes the output media item.

10. A non-transitory computer-readable medium with instructions stored thereon that, when executed by one or more computers, cause the one or more computers to perform operations comprising:
receiving user input that indicates one or more objects to be erased from a media item;
translating the user input to a bounding box;
providing a crop of the media item based on the bounding box to a segmentation machine-learning model;
outputting, with the segmentation machine-learning model, a segmentation mask for one or more segmented objects in the crop of the media item and a corresponding segmentation score that indicates a quality of the segmentation mask;
determining that the segmentation mask is invalid based on one or more of: the corresponding segmentation score failing to meet a threshold score, a number of valid mask pixels falling below a threshold number of pixels, a segmentation mask size falling below a threshold size, or the segmentation mask being greater than a threshold distance from a region indicated by the user input; and
responsive to determining that the segmentation mask is invalid, generating a different mask based on a region within the user input.

11. The computer-readable medium of claim 10, wherein the bounding box is an axis-aligned bounding box or an oriented bounding box.

12. The computer-readable medium of claim 10, wherein the user input includes one or more strokes made with reference to the media item.

13. The computer-readable medium of claim 12, wherein the bounding box is an oriented bounding box and wherein an orientation of the oriented bounding box matches an orientation of at least one of the one or more strokes.

14. The computer-readable medium of claim 10, wherein the segmentation machine-learning model is trained prior to the providing using training data that includes a plurality of training images and groundtruth segmentation masks.

15. A computing device comprising:
a processor; and
a memory coupled to the processor, with instructions stored thereon that, when executed by the processor, cause the processor to perform operations comprising:
receiving user input that indicates one or more objects to be erased from a media item;
translating the user input to a bounding box;
providing a crop of the media item based on the bounding box to a segmentation machine-learning model;
outputting, with the segmentation machine-learning model, a segmentation mask for one or more segmented objects in the crop of the media item and a corresponding segmentation score that indicates a quality of the segmentation mask;
determining that the segmentation mask is invalid based on one or more of: the corresponding segmentation score failing to meet a threshold score, a number of valid mask pixels falling below a threshold number of pixels, a segmentation mask size falling below a threshold size, or the segmentation mask being greater than a threshold distance from a region indicated by the user input; and
responsive to determining that the segmentation mask is invalid, generating a different mask based on a region within the user input.

16. The computing device of claim 15, wherein the bounding box is an axis-aligned bounding box or an oriented bounding box.

17. The computing device of claim 15, wherein the user input includes one or more strokes made with reference to the media item.

18. The computing device of claim 17, wherein the bounding box is an oriented bounding box and wherein an orientation of the oriented bounding box matches an orientation of at least one of the one or more strokes.

19. The computing device of claim 15, wherein prior to the providing a crop of the media item, the segmentation machine-learning model is trained using training data that includes a plurality of training images and groundtruth segmentation masks.

20. The computing device of claim 15, wherein the operations further comprise:
providing a user interface that receives the user input, wherein the user input is selected from a group of a circle that surrounds the one or more objects, one or more lines on top of the one or more objects, a square that surrounds the one or more objects, and combinations thereof.

* * * * *